Nov. 9, 1965

L. J. KABELL ETAL 3,217,322

F.M. RADAR SYSTEM

Filed Jan. 12, 1954

*INVENTORS*
*L. J. KABELL*
*C. W. ROESCHKE*

BY

*Roland A. Anderson*

ATTORNEY

United States Patent Office 3,217,322
Patented Nov. 9, 1965

3,217,322
F.M. RADAR SYSTEM
Louis J. Kabell, Albuquerque, N. Mex., and Conrad W. Roeschke, Palo Alto, Calif., assignors, by mesne assignments, to the United States of America as represented by the United States Atomic Energy Commission
Filed Jan. 12, 1954, Ser. No. 403,669
4 Claims. (Cl. 343—14)

This invention relates to an improved range indicator employing a novel system characterized by a maximum of simplicity and of selectivity. The system to be described is useful where it is desired to indicate the attainment of a preselected distance from an object or to determine the distance thereof at any time. Especially, the selectivity of the system enables such measurements to be made with substantial freedom from interference by other radar emissions.

It is well known in the art to measure the altitude of an airplane by causing the emission from the plane of a frequency modulated wave of radio frequency which is to be reflected from the ground or sea and comparing continuously in frequency the transmitted wave with the reflected wave received at the plane. Such an apparatus and procedure are described in the article, "A Terrain Clearance Indicator," by Espenschied and Newhouse, published in 1939 in the Bell System Technical Journal, vol. 18, p. 222. The system of the present invention makes use of that principle in a novel manner, adding the elements requisite to increase selectivity and insulate against jamming.

A general object of the invention is therefore to provide an improved radar ranging system.

Another object is to provide such a system with increased selectivity.

Another object is to provide, in addition to increased selectivity, increased immunity to interfering radar signals.

The system of apparatus to be described includes a single dial which, by varying one element alone, serves to set the range at which an indication shall be obtained or, alternatively, to determine the range at any instant.

Thus, another object of the invention is to provide a radar ranging system of maximum simplicity consistent with the attainment of the other objects recited.

Figure 1:
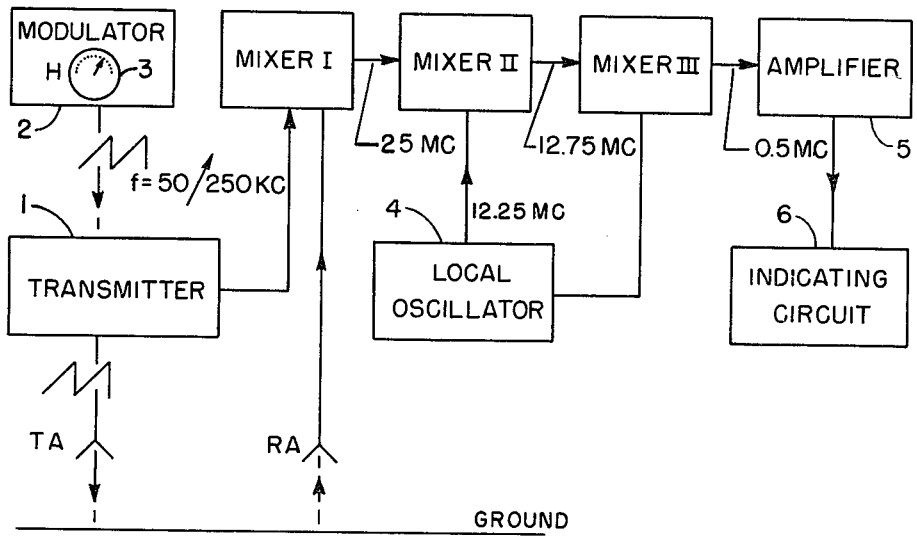
Figure 2:
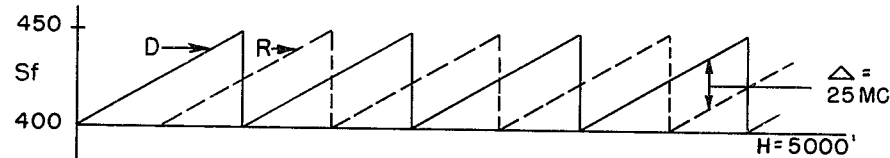
Figure 3:
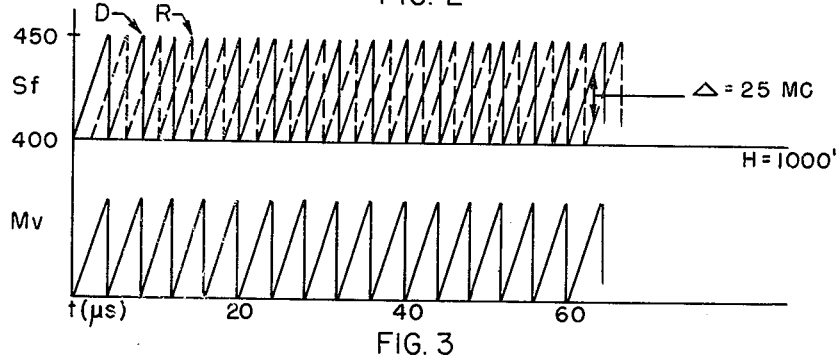

The invention itself, with additional objects and advantages, will be understood from the following description of an exemplary embodiment thereof read with reference to the accompanying figures in which FIG. 1 is a block schematic of the system and FIGS. 2 and 3 are graphs corresponding respectively to ranges of 5,000 and 1,000 feet.

Referring first to FIG. 1, the system includes radar transmitter 1 arranged to transmit a wave of frequency from 400 to 450 megacycles per second, cyclically modulated in frequency between these limits by modulator 2, which may be, for example, a multivibrator capable of providing modulating pulses of desired length and repetition rate. By transmitting antenna TA the frequency modulated wave is radiated toward the ground or the sea or other object whose range is desired. The reflected wave therefrom is received by receiving antenna RA and is mixed in mixer I with a portion of the radiation from antenna TA.

It is easy to arrange that the frequency change in the wave radiated by antenna TA shall be linear with time and that the frequency radiated shall return from maximum to minimum almost instantaneously. If the object ranged is at a distance of 5,000 feet the reflected wave will arrive at antenna RA in 10 microseconds (velocity of propagation about 1,000 feet per microsecond). If the change in radiated frequency from 400 to 450 megacycles takes place in 20 microseconds the direct and the reflected wave will differ in frequency at any instant by 25 megacycles. For the same frequency difference to be present, say at range 1,000 feet, the frequency change in the radiated wave must take place in 4 microseconds. In general, therefore, the repetition rate of frequency change of transmitter 1 must be inversely proportional to range, or $$M = \frac{250{,}000 \text{ kc.}}{R}$$

or $$R = \frac{250{,}000 \text{ kc.}}{M}$$

where $M$=repetition rate in kilocycles per second, and
$R$=range in feet.

The output circuit of mixer I is sharply tuned to 25 megacycles, so that the range is obtained from the foregoing formula when dial 3, which controls the repetition rate, is set to obtain an output signal from mixer I and the graduation on dial 3 then indicates the range.

FIGS. 2 and 3 each illustrate the time-frequency relation of D, the directly radiated wave, and of R, the reflected wave shown dashed in each figure. It will be seen that at every instant when a 25 megacycle frequency difference appears the reflected wave has started back from an object at the specified range.

In each of FIGS. 2 and 3 there are shown the signal frequency $S_f$ and, separately, the modulator voltage $M_v$ as functions of time in microseconds.

The depth of range indication depends on the frequency range, above and below the normal specified 25 megacycles, over which the output circuit of mixer I will yield a signal. For example, if the range depth is to be 200 feet greater or less than 1,000 feet, the total travel time of the wave will be 2.4 or 1.6 microseconds and the frequency difference will be 30 or 20 megacycles respectively. It is easy to restrict the band width passed by mixer I to the limits 24.9 and 25.1 megacycles corresponding to a depth of range of ±4 feet at a normal range of 1,000 feet or ±20 feet at 5,000 feet. Percentagewise this is the same as the spread of the output circuit tuning of mixer I.

The selectivity of the system with respect to depth of range and therewith the immunity to interfering signals may be greatly increased by adding the components shown in FIG. 1 between mixer I and indicating device 6.

The 25 megacycle output signal from mixer I is supplied to mixer II where it is mixed with the output of local oscillator 4. Oscillator 4 is tuned to the fixed frequency 12.25 megacycles so the output of mixer II is 12.75 megacycles. The same percentage latitude is possible in the tuning of mixer II as in mixer I, and this further narrows the depth of range and at the same time narrows the frequency range within which an interfering signal must lie if it is to bring about a false indication.

The output of oscillator 4 is supplied also to mixer III, there to be mixed with the 12.75 megacycle signal from mixer II. The result is a frequency 0.5 megacycle as the final representative of the frequency comparison of direct and reflected waves.

This 500 kc. signal is amplified by amplifier 5 and then applied to operate indicating device 6 (of any desired kind) or to set in operation any desired apparatus.

In order to show how triple conversion operates to improve the selectivity of the device, let us assume the station to be operating at 1500 feet range but adjusted to operate indicator 6 at a desired range of 1000 feet.

At this 1500 foot range the output of the first mixer will be 37.5 mc. The first I.F. circuit is tuned to 25 mc. so that the rejection factor could be stated as $$\frac{37.5}{25} = 1.5$$

In the second mixer, even if a small amount of 37.5 mc. signal could mix with the local oscillator of 12.25 mc., it will produce a difference frequency of 25.25 mc. The second output circuit is tuned to 12.75 mc., making the second rejection factor $$\frac{25.25}{12.75} = 1.98$$

Now even if a small amount of the 25.25 mc. signal gets into the third mixer to mix with the 12.25 mc. local oscillator signal, it will produce a difference frequency of 13.00 mc. The amplifier circuit is tuned to 0.5 mc., making this third rejection factor $$\frac{13}{0.5} = 26$$

In this way multiple conversion improves selectivity by increasing the rejection factor each time conversion is accomplished.

In FIGS. 1 and 2 it will be noticed that when the transmitting station is at the range prescribed, set by dial 3, there is beginning at the center of the first transmitted signal (except for minute gaps during the return toward 400 megacycles of the frequency of either the direct or the reflected waves) a continuous output from mixer I.

Also, it will be understood that an interfering signal, to be harmful, must duplicate in all respects the extent and the repetition rate of frequency modulation of the transmitter and must also be of frequency overlapping the frequencies radiated from transmitter TA. General interference could produce in each cycle of modulation of transmitter TA a momentary signal of the proper frequency for indicator 6, but that indicator is designed in known manner to respond only to a substantially continuous signal.

To be understood that were it not desired to increase selectively, oscillator 4 and mixers II and III might be dispensed with and indicating device 6 connected directly or with interventing amplification to the output of mixer I. The elements between mixer I and device 6 may device 6 may be regarded as a signal transmitting means responsive to the output of mixer I.

The invention has been set forth by describing as an illustrative embodiment a radar system. Obvious changes in transmitting and receiving elements will enable the invention to be used in sonar ranging, and the object ranges specifically discussed may be changed as desired by changes in operating constants. Only a single control element with a repetition rate, that is the frequency of the sawtooth wave from modulator 2, needs to be varied to select the range at which indication is to be obtained. The necessary revisions are within the skill of the art.

We claim:

1. Means for determining the distance of an object from a station comprising at the station means for transmitting to the object waves of controllable frequency and means for receiving said waves after reflection from the object, a first mixer the input of which is supplied simultaneously with the transmitted waves and with previously transmitted waves reflected from the object, said first mixer providing an output only of waves having a prescribed difference in frequency between the waves supplied to its input, an oscillator generating waves of a fixed frequency differing by a selected value from the prescribed difference, a second mixer supplied jointly by the outputs of the first mixer and of the oscillator and providing an output only of waves of a second prescribed frequency difference between those of the inputs supplied to the second mixer, a third mixer supplied jointly by the outputs of the second mixer and of the oscillator and providing an output only of waves of a third prescribed frequency difference between those of the input supplied to the third mixer, means for indicating the existence of an output from the third mixer, and means for cyclically varying the frequency of the transmitted waves through a desired range at a variable repetition rate and means manually controllable and independent of the receiving means for adjusting the repetition rate to bring about operation of the indicating means at a desired station-to-object distance, said rate adjusting means being provided with a dial graduated in distance units.

2. Distance-determining means as in claim 1 in which the waves generated by the oscillator are of lower frequency than the prescribed difference frequency, the output of the second mixer is a frequency intermediate the prescribed difference frequency and that of the oscillator and greater than the latter and the output of the third mixer is a frequency lower than the output of the second mixer and that of the oscillator.

3. A system for determining the distance between a station and an object, comprising at the station: means for transmitting waves of controllable frequency to the object; means for receiving said waves after reflection from the object; a first mixer for mixing transmitted waves with reflected waves, said mixer being constructed and arranged to pass only a chosen first difference frequency; an oscillator for generating a local signal whose frequency is lower than the first frequency; a second mixer for mixing the output of the first mixer and the local signal, said mixer being constructed and arranged to pass only a chosen second difference frequency intermediate the first frequency and the frequency of the local signal; a third mixer for mixing the output of the second mixer and the local signal, said mixer being constructed and arranged to pass only a chosen third difference frequency lower than any of the other said frequencies; means responsive to the third frequency for indicating the presence thereof; means for cyclically varying the frequency of the transmitted waves through a prescribed range at a variable repetition rate; and manually controllable means for adjusting the repetition rate, said means being independent of the receiving means and including a dial calibrated in distance units, whereby the system is adjusted for determination of a chosen distance, determination of said distance being indicated by said indicating means.

4. In a system for determining the distance between a station and an object, wherein waves are transmitted from the station to the object and reflected back again, the frequency of said waves being cyclically varied through a prescribed range at a variable repetition rate, and wherein the transmitted and reflected waves are mixed in a first mixer having an output circuit responsive only to a chosen first difference frequency, the output signal of said mixer being successively heterodyned to yield a considerably lower frequency signal which is detected as an indication of distance, the provision of heterodyning means comprising: an oscillator for generating a fixed-frequency local signal whose frequency is lower than the first frequency; a second mixer for mixing the output of the first mixer and the local signal, said mixer having an output circuit responsive only to a chosen second difference frequency intermediate the first frequency and the frequency of the local signal; and a third mixer for mixing the output of the second mixer and the local signal, said mixer having an output circuit responsive only to a chosen third difference frequency lower than any of the other said frequencies, the output signal of said mixer being detected as an indication of distance.

References Cited by the Examiner

UNITED STATES PATENTS

| | | | |
|---|---|---|---|
| 2,505,692 | 4/50 | Staal | 343—14 |
| 2,518,864 | 8/50 | Carlson | 343—14 |
| 2,529,510 | 11/50 | Manley | 343—7.5 |
| 2,537,593 | 1/51 | Landon | 343—17.5 |
| 2,553,907 | 5/51 | Fleming-Williams | 343—14 |
| 2,632,161 | 3/53 | Naday | 343—14 |
| 2,695,404 | 11/54 | Barker | 343—8 |

OTHER REFERENCES

The Radio Amateur's Handbook; American Radio Relay League; page 122, 1943, 20th edition.

CHESTER L. JUSTUS, *Primary Examiner.*

NORMAN H. EVANS, FREDERICK M. STRADER,
*Examiners.*